United States Patent [19]
Pellman

[11] 3,780,436
[45] Dec. 25, 1973

[54] DEVICE TO CUT OR SEPARATE MASSES OF FROZEN FOOD

[75] Inventor: Ronald C. Pellman, Trumbull, Conn.

[73] Assignee: Utica Cutlery Company, Utica, N.Y.

[22] Filed: May 24, 1971

[21] Appl. No.: 146,276

[52] U.S. Cl. .................... 30/123 R, 30/355, 83/607
[51] Int. Cl. ............................................. B26b 1/04
[58] Field of Search .................... 30/123 R, 355; 146/140, 141, 146 R, 146 A; 83/607

[56] References Cited
UNITED STATES PATENTS
272,549  2/1883  Hill ................................ 146/146 R
2,279,833  4/1942  Madan ................................ 30/355

FOREIGN PATENTS OR APPLICATIONS
178,987  11/1906  Germany ..................... 146/146 R Primary Examiner—James L. Jones, Jr.
Assistant Examiner—Mark S. Bicks
Attorney—Pennie, Edmonds, Morton, Taylor & Adams

[57] ABSTRACT

There is disclosed a frozen food cutter having a blade of toothed configuration, each tooth being of unique wedge-shaped and arcuate design.

9 Claims, 5 Drawing Figures

PATENTED DEC 25 1973 3,780,436

INVENTOR
Ronald C. Pellman
BY Pennie, Edmonds,
Morton, Taylor & Adams
ATTORNEYS

DEVICE TO CUT OR SEPARATE MASSES OF FROZEN FOOD

BACKGROUND OF THE INVENTION

In the household cutting of frozen foods several difficulties have arisen. Frozen foods may require cutting into small chunks or pieces, for example, to accelerate thawing, or to decrease cooking time; to permit the use of a small cooking utensil, or to cut a portion for immediate use while the remainder is again stored in the frozen state for later use.

Currently known frozen food cutters are simply toothed knives which cut by sawing through a frozen food mass. This quickly dulls the edge, rendering the device useless. Another disadvantage inherent in the design of such cutters is that the sawing action produces a messy residue of small food particles during cutting. Furthermore, such conventional knives may slip readily and cut the person holding the food being cut.

It is the purpose of the present invention to provide a superior device for cutting frozen foods which obviates the aforementioned difficulties.

SUMMARY OF THE INVENTION

In accordance with the present invention, a frozen food cutter has a base upon which a mass of frozen food may be placed. Projecting upwardly from the base at one end is a post which pivotally mounts a cutter blade of unique toothed configuration. Each blade tooth has an abrupt cutting wedge along its lower edge, adjacent to an area of decreased thickness leading to a second more gradual wedge-shaped surface. Above the abrupt cutting wedge the rearward edge of each tooth forms an arcuate vertical rib of the same general thickness as the maximum thickness of the cutting wedge. The combination of abrupt cutting wedge and a second, vertically spaced wedge, causes the frozen food mass to fracture readily into useable chunks when the blade is forced downwardly toward the cutter base.

DESCRIPTION OF THE PREFERRED EMBODIMENT

Figure 1:
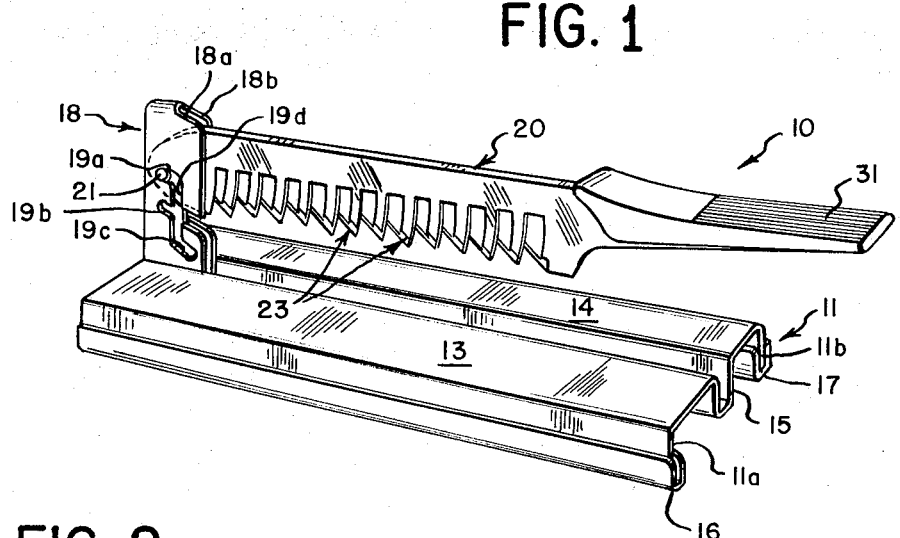
FIG. 1 is a perspective view of a frozen food cutter constructed according to the present invention.

Referring to the drawing, and initially to FIG. 1 thereof, a frozen food cutter 10 constructed according to the present invention has been illustrated. The cutter 10 comprises a base 11 formed, for example, of sheet metal and having legs 11a and 11b extending downwardly from horizontal food platforms 13 and 14. Platforms 13 and 14 are separated by a central longitudinal U-shaped channel 15. The ends of legs 11a and 11b are preferably encased by elastomer strips or feet 16 and 17.

Extending perpendicularly upwardly from one end of the base 11 and from channel 15 is a removable pivot post 18. Post 18 is bifurcated, having opposing sides 18a and 18b which define grooves 19a, 19b and 19c connected by the vertical groove 19d. The grooves 19a and 19b are upwardly sloped for a reason which will be explained. A blade 20 has a pin 21 at its forward end which is received within one of the grooves 19a–19c. At the opposite end of the blade 20 a handle 31 is affixed thereto by any suitable fastening means. Groove 19c is provided to allow the blade 20 to be stored integrally with the base 11 and the pivot post 18 when the device is not in use. With pin 21 engaged in groove 19c the blade teeth are protected within the channel 15.

Figure 3:
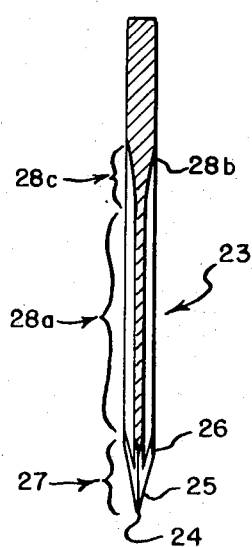
FIGS. 3–5 are respectively sections taken in the direction of arrows 3—3, 4—4 and 5—5 of FIG. 2.

Blade 20 is equipped with a plurality of teeth 23 which are of unique configuration. With respect to FIG. 3, it will be observed that each tooth 23 has a cutting edge 24 contiguous to a wedging surface 25 whose thickness locally increases abruptly to point 26 thus forming a localized cutting wedge 27. Adjacent to this localized cutting wedge 27 the major portion of each tooth 23 is substantially reduced in thickness for the greater extent 28a of the blade's height and area until at 28b such thickness again increases approximately to the thickness at 26. Thus, a second wedge 28c is formed by the gradual widening of surface 28a to the point 28b. The relationship of the wedges 27 and 28c is as follows: The small abrupt cutting wedge 27 is first thrust deeply into the frozen food mass, and is supplemented by the more gradual wedging action of wedge 28c at the surface of the frozen material after a predetermined depth of penetration by wedge 27 has been reached.

Figure 4:
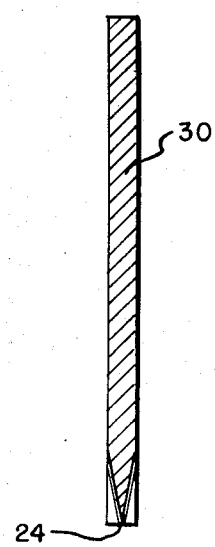
Figure 5:
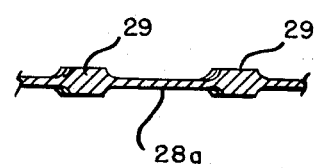

With respect to FIG. 5, it will be seen that each tooth 23 also has an arcuate, vertical rib 29 which defines the rearward edge of each tooth and which has a constant thickness approximately that of the thickness at point 26. The rearward part 30 of blade 20 (see FIG. 4) also has the approximate thickness of each rib 29. The curvature of each rib is substantially that of a circle whose center is the pin 21 and whose radius is the distance from each rib 29 to the pin 21. Thus, the forwardmost of the ribs 29 have a greater degree of curvature than those ribs more rearward in the sequence.

Figure 2:
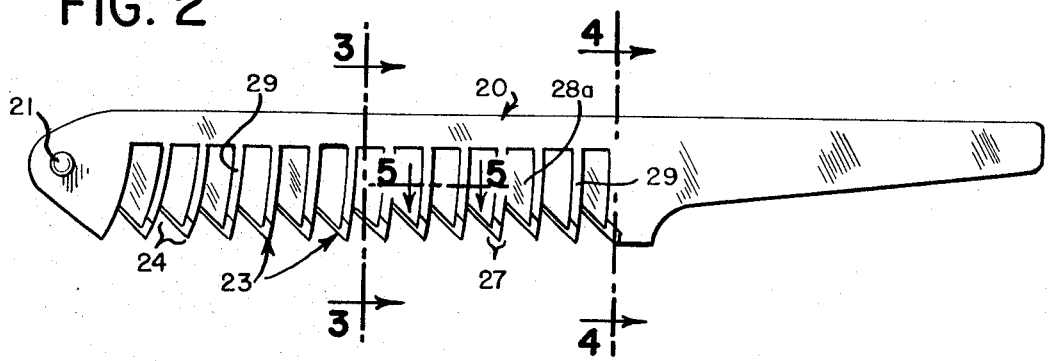
FIG. 2 is a side elevation of a blade portion of the cutter of FIG. 1.

With respect to FIG. 2 it will be seen that the sharpened edge 24 of each tooth forms an acute angle with the rib 29. The sharp points thus formed assist the initial penetration of the blade into the frozen food mass. This tooth shape also causes the frozen food to be wedged towards the pivot post 18 when pressure is applied to the blade, thus holding the frozen material in place during the cutting process. Further, the wedge shape of the teeth presents a maximum length of sharpened edge to the frozen material, thus contributing to long blade life.

The purpose and function of the above-described configuration is the following: each tooth 23 is uniquely constructed to have an abrupt sharp cutting wedge 27 as described above. When the blade 20 is forced downwardly against a frozen food mass (not shown) placed upon the base 11, the abrupt wedge 27 will first penetrate the frozen mass. The more gradual wedge 28c will supplement the wedging action of cutting wedge 27 and it has been found that as the wedge 28c enters the surface of the frozen food mass, the mass will be split by the combined action of the two wedges 27 and 28c. In other words, by causing the cutting wedge 27 to penetrate to a predetermined depth, followed by the supplementary wedging action of wedge 28c, the food will be split. Furthermore, it has been found that such splitting will occur relatively independently of the thickness of the frozen mass, that is the total penetration is generally the same for say, a 1 inch thick mass or a 3 inch thick mass. Ribs 29 also act as vertical spikes to continue the splitting action initiated by the cutting wedge 27. Since each rib 29 has the curvature of a circle whose radius is the distance from the center of rotation to such rib, the ribs will penetrate readily and will be aligned with their respective paths of rotation. Ribs 29, furthermore, act as reinforcements of each tooth 23 which, because of the thinness of sections 28a, might deflect and/or fracture during the downward stroke. Less force is required for such penetration because the sections 28a of each blade do not come into much frictional contact with the frozen mass. Channel 15 in base 11 permits the blade to pass entirely through the frozen mass.

As can be seen from FIG. 1, the blade 20 is easily inserted at different heights in the post 18 by means of slots 19a–19c. Due to the engagement of the sides 18a, 18b with the pin 21, it is virtually impossible for the blade 20 to twist during the cutting stroke. The upward slope of grooves 19a and 19b "cams" the blade 20 forward, that is, keeps the blade in the selected slot as a result of the upward pressure on the pin 21. It is obvious also from the construction of the frozen food cutter that tremendous leverage may be asserted to cut apart a mass of frozen food in a safe manner, that is, the food need not be held during cutting. Moreover, the frozen food mass is separated with one application of pressure and does not require the multiple saw strokes typical of previous devices. The unique toothed configuration, in addition to cutting through frozen food masses more easily, does so with considerably less messy residue than heretofore thought possible with prior cutters which operate by a sawing action. Cleaning of the cutter parts is made easy by the ready removability of the blade from the post 18 and the removability of post 18 from the base 11. In addition to frozen food, the above-described device may also be used to cut certain relatively dense unfrozen foods such as turnips.

It will be understood that the above description is of a particular embodiment of the invention and is therefore representative. In order to appreciate the scope of the invention, reference should be made to the appended claims.

What is claimed is:

1. In a cutting device suitable for use as a frozen food cutter and the like, having a horizontal member upon which food may be placed for cutting, a blade supporting post extending from said member, a cutting blade and means for pivotally supporting one end of said blade in said post, the improvement comprising said blade having a series of teeth, each tooth having a cutting edge and at lest two wedging surfaces extending from said edge upwardly which widen to form an abrupt cutting wedge, said abrupt cutting wedge comprising a minor portion of each tooth while the major portion of each tooth is significantly reduced in thickness relative the maximum width of said abrupt cutting wedge.

2. A cutting device according to claim 1 wherein above said reduced thickness portion each tooth gradually widens to form a second wedge.

3. A cutting device according to claim 2 wherein each tooth has an arcuate rib extending vertically which defines the rearward edge of each tooth, the curvature of each said rib conforming to the circumference of a circle whose radius is the distance from said rib to a point where said blade pivots with respect to said post.

4. The cutting device according to claim 3 wherein the thickness of each said rib is approximately the same as the thickness of each wedge.

5. The cutting device according to claim 1 wherein the pivot support has opposing sides to receive the end of said blade, said pivot support further defining a plurality of transverse upwardly sloped slots interconnected by a rearwardly disposed vertical slot, a pin extending transversely from the end of said blade, said transverse slots accommodating the blade pin to permit height adjustments to said blade relative to said members, the opposing sides of said pivot support preventing twisting of said blade during rotation thereof within said support and the upward sloping of said slots causing said pin to be cammed forwardly within said slots.

6. The cutting device according to claim 1 wherein said horizontal member is a base having two parallel platforms separated by a channel to permit the blade to pass through the frozen food, said base having depending legs connected to the outer edge of each platform.

7. The cutting device according to claim 6 wherein the means for pivotally supporting one end of said blade in said post permits said blade to be received within said channel for storing of the blade.

8. In a cutting device suitable for use as a frozen food cutter and the like, having a horizontal member upon which food may be placed for cutting, a blade supporting post extending from said member, a cutting blade and means for pivotally supporting one end of said blade in said post, the improvement comprising said blade having a series of teeth, each tooth having two edges, a rearward edge and a cutting edge defining by a cutting wedge, said rearward edge having a major portion being at least as thick as the maximum thickness of said cutting wedge and the remainder of said blade, said cutting edge inclined upwardly toward said post and constituting a major portion of said edges such that food placed on said horizontal member for cutting is held upon said member and urged toward said post when said blade is swung downwardly through said food.

9. In a cutting device suitable for use as a frozen food cutter and the like, having a horizontal member upon which food may be placed for cutting, a blade supporting post extending from said member, a cutting blade and means for pivotally supporting one end of said blade in said post, the improvement comprising said blade having a series of teeth, each tooth having two edges, a rearward edge and a cutting edge defined by a cutting wedge, said rearward edge defining a vertical rib, said cutting edge portion of each tooth forming an acute angle with respect to said rib, said cutting edge inclined upwardly toward said post and constituting a major portion of said edges such that food placed on said horizontal member for cutting is held upon said member and urged toward said post when said blade is swung downwardly through said food.

* * * * *